US010681336B2

(12) United States Patent
Gallup et al.

(10) Patent No.: US 10,681,336 B2
(45) Date of Patent: Jun. 9, 2020

(54) DEPTH MAP GENERATION (71) Applicant: Google LLC, Mountain View, CA (US)

(72) Inventors: David Gallup, Bothell, WA (US); Fu Yu, Princeton, NJ (US); Steven Maxwell Seitz, Seattle, WA (US)

(73) Assignee: Google LLC, Mountain View, CA (US)

( * ) Notice: Subject to any disclaimer, the term of this patent is extended or adjusted under 35 U.S.C. 154(b) by 118 days.

(21) Appl. No.: 14/278,471

(22) Filed: May 15, 2014

(65) Prior Publication Data
US 2015/0109416 A1 Apr. 23, 2015

Related U.S. Application Data (63) Continuation of application No. 14/061,423, filed on Oct. 23, 2013, now Pat. No. 8,760,500.

(51) Int. Cl.
*H04N 13/271* (2018.01)
*G06T 7/579* (2017.01)

(52) U.S. Cl.
CPC .......... *H04N 13/271* (2018.05); *G06T 7/579* (2017.01); *G06T 2207/10016* (2013.01); *G06T 2207/30244* (2013.01)

(58) Field of Classification Search
CPC .......... H04N 13/0239; H04N 13/0055; H04N 13/0296
(Continued)

(56) References Cited

U.S. PATENT DOCUMENTS 8,456,517 B2  6/2013  Spektor et al.
8,934,677 B2 * 1/2015  Jin .................. H04N 5/232
                                                           382/107
(Continued)

FOREIGN PATENT DOCUMENTS

CN  101400001 A  4/2009
CN  101815225 A  8/2010
(Continued)

OTHER PUBLICATIONS

Notification of First Office Action for Chinese Patent Application No. 201480063939.0 dated Feb. 5, 2018.
(Continued)

*Primary Examiner* — Shawn S An
(74) *Attorney, Agent, or Firm* — Lerner, David, Littenberg, Krumholz & Mentlik, LLP (57) ABSTRACT

Aspects of the disclosure relate generally to generating depth data from a video. As an example, one or more computing devices may receive an initialization request for a still image capture mode. After receiving the request to initialize the still image capture mode, the one or more computing devices may automatically begin to capture a video including a plurality of image frames. The one or more computing devices track features between a first image frame of the video and each of the other image frames of the video. Points corresponding to the tracked features may be generated by the one or more computing devices using a set of assumptions. The assumptions may include a first assumption that there is no rotation and a second assumption that there is no translation. The one or more computing devices then generate a depth map based at least in part on the points.

20 Claims, 8 Drawing Sheets

(58) Field of Classification Search
USPC .......................................... 348/46, 51, 43, 42
See application file for complete search history.

(56) References Cited

U.S. PATENT DOCUMENTS

| | | | |
|---|---|---|---|
| 2004/0058715 A1* | 3/2004 | Taniguchi | G06F 3/1423 |
| | | | 455/566 |
| 2005/0286758 A1* | 12/2005 | Zitnick, III | G06K 9/20 |
| | | | 382/154 |
| 2007/0031064 A1* | 2/2007 | Zhao | G06K 9/00214 |
| | | | 382/285 |
| 2009/0115865 A1* | 5/2009 | Kamada | H04N 5/232 |
| | | | 348/222.1 |
| 2009/0217187 A1 | 8/2009 | Kendall et al. | |
| 2009/0315978 A1* | 12/2009 | Wurmlin et al. | 348/43 |
| 2010/0250136 A1* | 9/2010 | Chen | G06T 1/0021 |
| | | | 701/300 |
| 2010/0265316 A1 | 10/2010 | Sali et al. | |
| 2011/0255775 A1 | 10/2011 | McNamer et al. | |
| 2012/0262553 A1 | 10/2012 | Chen et al. | |
| 2013/0063566 A1* | 3/2013 | Morgan-Mar | G06T 7/571 |
| | | | 348/46 |
| 2013/0222633 A1 | 8/2013 | Knight et al. | |
| 2014/0064607 A1* | 3/2014 | Grossmann | G06T 3/0093 |
| | | | 382/154 |
| 2014/0267608 A1* | 9/2014 | Dhome et al. | 348/43 |
| 2015/0220805 A1 | 8/2015 | Chen et al. | |

FOREIGN PATENT DOCUMENTS

| | | |
|---|---|---|
| CN | 101945295 A | 1/2011 |
| CN | 103177446 A | 6/2013 |

OTHER PUBLICATIONS

Heeger D J et al: "Subspace Methods for Recovering Rigid Motion. \I: Algorithm and Implementation", International Journal of Computer Vision, Kluwer Academic Publishers, Norwell, US, vol. 7, N . 2, Jan. 1, 1992 (Jan. 1, 1992) , pp. 95-117, XP000268605.
International Search Report and Written Opinion for Application No. PCT/US2014/060084 dated Jan. 8, 2015.
Jiejie Zhu et al: "Spatial-Temporal Fusion for High Accuracy Depth Maps Using Dynamic MRFs", IEEE Transactions on Pattern Analysis and Machine Intelligence, IEEE Computer Society, USA, vol. 32, No. 5, May 1, 2010 (May 1, 2010), pp. 899-909, XP011321494.
D. Chaikalis, G. Passalis, N. Sgouros, D. Maroulis, and T. Theoharis, Near Real-Time 3D Reconstruction from Inlm Video Stream, 2008, 12 pages.
Omid Shakernia, René Vidal, and Shankar Sastry, Infinitesimal Motion Estimation from Multiple Central Panoramic Views, 2002, 6 age.
"Urban 3D Modelling From Video" [online]. <www.cs.unc.edu/Research/urbanscape>, 5 pages, Sep. 16, 2013.
John Oliensis, The Least-Squares Error for Structure from Infinitesimal Motion, 2005, 55 pages.
"KLT: An Implementation of the Kanade-Lucas-Tomasi Feature Tracker", [online]. [Retrieved Oct. 22, 2013]. <http://www.ces.clemson.edu/-stb/klt/>, 1 page.
Bruce D. Lucas and Takeo Kanade, An Iterative Image Registration Technique with an Application to Stereo Vision, 1981, 6 pages.
Stan Birchfield, Derivation of Kanada-Lucas-Tomasi Tracking Equation, Jan. 20, 1997, 2 pages.
"Ceres-Solver-A Nonlinear Least Squares Minimizer" [online], [Retrieved Oct. 22, 2013], <https://code.google.com/p/ceres-solver/>, 2 pages.
David Crandall, Andrew Owens, Noah Snavely, and Dan Huttenlocher, Discrete-Continuous Optimization for Large-Scale Structure from Motion, 2011, 8 pages.
Carlos Hernández and George Vogiatzis, Shape From Photographs: A Multi-View Stereo Pipeline, 31 pages, 2010.
Christopher Geyer, Todd Templeton, Marci Meingast, and S. Shankar Sastry, The Recursive Multi-Frame Planar Parallax Algorithm, 2006, 8 pages.
Philipp Krähenbühl and Vladlen Koltun, Efficient Inference in Fully Connected CRFs With Gaussian Edge Potentials, 2011, 9 pages.
Carlo Tomasi and Takeo Kanade, Shape and Motion From Image Streams: a Factorization Method—Part 3, Detection and Tracking of Point Features, Apr. 1991, 22 pages.
Bill Triggs, Philip F. McLauchlan, Richard I. Hartley, and Andrew W. Fitzgibbon, Bundle Adjustment—A Modern Synthesis, 2000, 75 pages.
O.J. Woodford, P.H.S. Torr, I.D. Reid, and A.W. Fitzgibbon, Global Stereo Reconstruction Under Second Order Smoothness Priors, 2008, 8 pages.
Christopher Zach, David Gallup, and Jan-Michael Frahm, Fast Gain-Adaptive KLT Tracking on the GPU, 2008, 7 pages.
"Epipolar Geometry", [online]. [Retrieved Oct. 22, 2013]. <http://www.cs.columbia.edu/jebara/htmlpapers/SFM/node8. html>, 3 pages.
Richard Hartley and Yongduek Seo, Verifying Global Minima for L2 Minimization Problems, 2008, 8 pages.
J.Q. Fang and T.S. Huang, Solving Three-Dimensional Small-Rotation Motion Equations: Uniqueness, Algorithms, and Numerical Results, May 1984, pp. 183-206, vol. 26, issue 2.

\* cited by examiner

DEPTH MAP GENERATION

CROSS-REFERENCE TO RELATED APPLICATIONS

The present application is a continuation of U.S. patent application Ser. No. 14/061,423, filed on Oct. 23, 2013, the disclosure of which is incorporated herein by reference.

BACKGROUND

Various systems allow users to generate depth maps or 3-dimensional (3D) representations of structures using image frames of videos or still images. Typically, such systems require an immense amount of computing power or large numbers of images captured from different locations. However, these systems are generally unable to create depth maps from still images or images which have very little differences between them.

SUMMARY

Aspects of the disclosure provide computer-implemented method. The method includes receiving, by one or more computing devices, an initialization request for a still image capture mode; after receiving the request to initialize the still image capture mode, automatically beginning, by the one or more computing devices, to capture a video including a plurality of image frames; tracking, by the one or more computing devices, features between a first image frame of the video and each of the other image frames of the video; generating, by the one or more computing devices, a set of 3D points corresponding to the tracked features using a set of assumptions, the set of assumptions including a first assumption that there is no rotation between the plurality of image frames of the video and a second assumption that there is no translation between the plurality of image frames of the video; and generating a depth map of the scene, by the one or more computing devices, based at least in part on the set of 3D points.

In one example, the method also includes, after beginning to capture the video, receiving instructions to capture a still image of the scene and in response to receiving the instructions, stopping the capture of the video and capturing the still image. In another example, the method also includes associating the depth map with the still image; and storing the depth map, the still image, and the association in memory. In another example, the set of assumptions also includes a third assumption that depths of any observed points in the scene are initially set to random distances. In another example, generating the depth map includes using a smoothness prior that considers relationships of non-adjacent pixels. In another example, the method also includes using the depth map to generate a 3-dimensional representation of the scene. In another example, the one or more computing devices are cellular phones.

Another aspect of the disclosure provides a system comprising one or more computing devices. The one or more computing devices are configured to receive an initialization request for a still image capture mode; after receiving the request to initialize the still image capture mode, automatically begin to capture a video including a plurality of image frames; track features between a first image frame of the video and each of the other image frames of the video; generate a set of 3D points corresponding to the tracked features using a set of assumptions, the set of assumptions including a first assumption that there is no rotation between the plurality of image frames of the video and a second assumption that there is no translation between the plurality of image frames of the video; and generate a depth map of the scene based at least in part on the set of 3D points.

In one example, the one or more computing devices are also configured to after beginning to capture the video, receive instructions to capture a still image of the scene and in response to receiving the instructions, stop the capture of the video and capturing the still image. In another example, the one or more computing devices are also configured to associate the depth map with the still image and store the depth map, the still image, and the association in memory. In another example, the set of assumptions also includes a third assumption that depths of any observed points in the scene are initially set to random distances. In another example, the one or more computing devices are also configured to generate the depth map includes by using a smoothness prior that considers relationships of non-adjacent pixels. In another example, the one or more computing devices are also configured to use the depth map to generate a 3-dimensional representation of the scene. In another example, the one or more computing devices are cellular phones.

A further aspect of the disclosure provides a non-transitory, computer-readable storage device on which computer readable instructions of a program are stored. The instructions, when executed by one or more processors, cause the one or more processors to perform a method. The method includes receiving an initialization request for a still image capture mode; after receiving the request to initialize the still image capture mode, automatically beginning to capture a video including a plurality of image frames; tracking features between a first image frame of the video and each of the other image frames of the video; generating a set of 3D points corresponding to the tracked features using a set of assumptions including a first assumption that there is no rotation between the plurality of image frames of the video and a second assumption that there is no translation between the plurality of image frames of the video; and generating a depth map of the scene based at least in part on the set of 3D points.

In one example, the method also includes after beginning to capture the video, receiving instructions to capture a still image of the scene and in response to receiving the instructions, stopping the capture of the video and capturing the still image. In another example, the method also includes associating the depth map with the still image and storing the depth map, the still image, and the association in memory. In another example, the set of assumptions also includes a third assumption that depths of any observed points in the scene are initially set to random distances. In another example, the method also includes receiving, from a client computing device, the video and sending, to the client computing device, the generated depth map. In another example, the method also includes generating the depth map by using a smoothness prior that considers relationships of non-adjacent pixels.

DETAILED DESCRIPTION

Overview

Aspects of the technology relate to generating a depth map of a scene. Each time a user captures an image using a camera, such as one associated with a mobile computing device such as a phone, the user may spend a few seconds holding the phone steady. The technology takes advantage of the time leading up to the mobile computing device actually capturing the image and the fact that the user's hand is not perfectly steady and may move the mobile computing device several millimeters. For example, during this time, the mobile computing device may actually capture a video or a series of image frames. These image frames may be used to generate the depth map and/or a 3D model of the scene.

In order to take advantage of the techniques described herein, the user may have to install an application, select a setting, and/or the like. After this, a user may attempt to capture an image of a scene using a mobile computing device. In doing so, the user may put the client computing device into a still image capturing mode (a camera mode). After doing so, the client computing device may automatically begin recording a video of the scene. The video may end when the client computing device begins to capture the still image of the scene, for example, when the user selects to take a picture.

After the video is captured, features may be tracked between image frames of the video. The specific features tracked may include, for examples, unique features such as corners, edges, etc. Outliers may be removed. Rather than tracking features in image frames sequentially, features may be tracked directly between a reference frame and all other images. For example, rather than tracking images between frame 1 and frame 2, then frame 2 and frame 3, images are tracked from frame 1 to frame 2, from frame 1 to frame 3, etc. This avoids the accumulating error and may provide better results.

After the feature correspondences between image frames are determined, the camera's position and the actual 3D points in the scene (that the features correspond to) must be determined in order to generate the depth map. A bundle adjustment where the points are parametrized by inverse depth may be used. In order to simplify the solution, all of the cameras for the image frames may be assumed to have the same location and orientation. In addition, the depths of the observed points in the scene may initially be set to random distances.

The result of the bundle adjustment is a depth map from which a 3D scene may be reconstructed. A smoothness function which accounts for relationships between non-adjacent pixels may be used in order to preserve consistency of depth around an object within the scene. This depth map may be associated with the image captured by the user. Such information may be useful to generate 3D models, for authentication, and for other such technologies.

The more image frames used, the greater the accuracy (or lesser the uncertainty) of the depth map. The minimum number of images required may depend upon various factors including the amount of light, the quality of the optics and resolution of the camera, the amount of movement by the user, and how far away the scene is.

Outliers are an inevitable result of the feature tracking, and generally may not affect the results. Thus, in some examples, a robustifier can be used. While the robustifier is not necessary, the bundle adjustment results may appear better.

Example Systems

Figure 1:
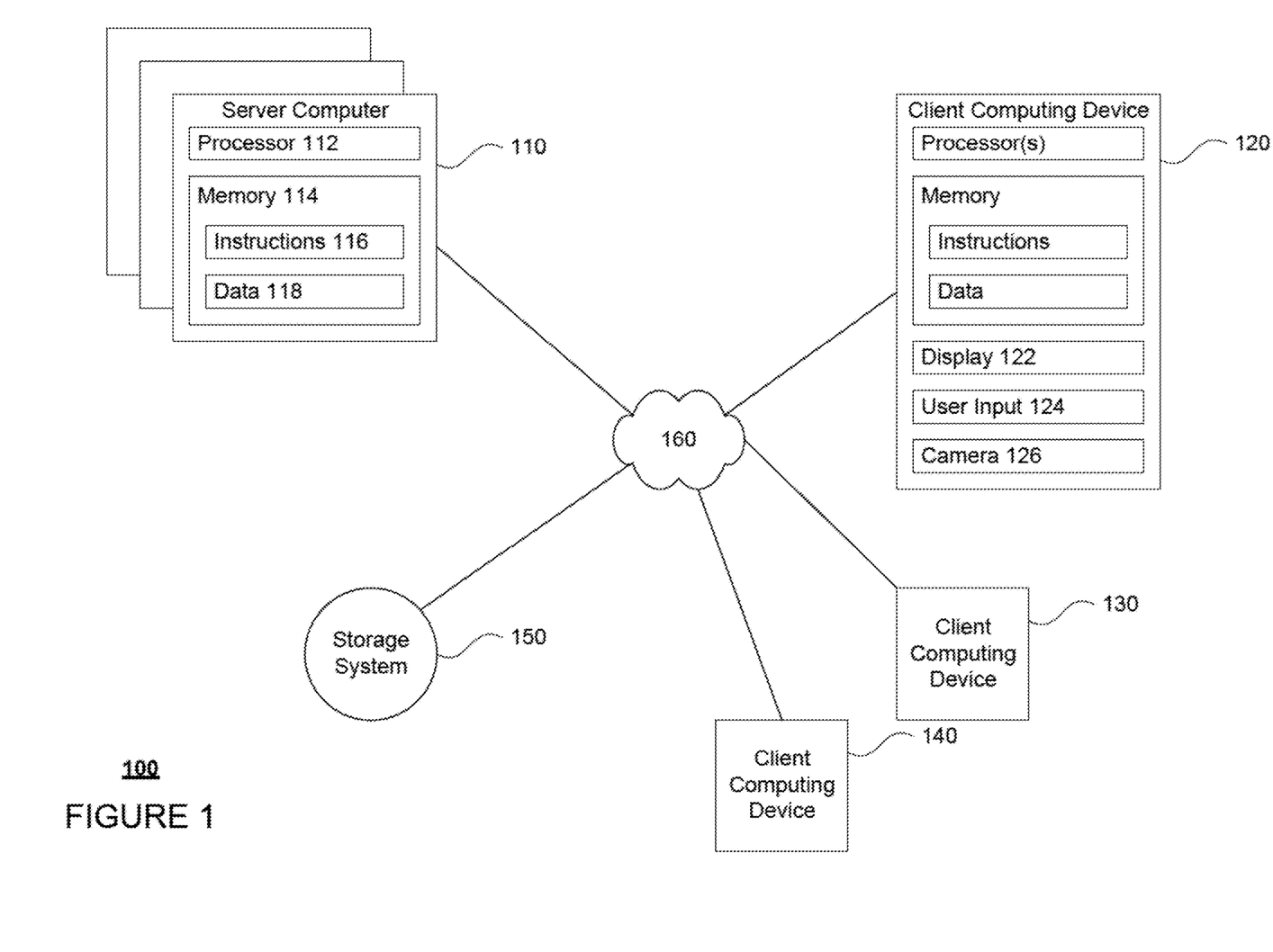
FIG. 1 is a functional diagram of an example system in accordance with aspects of the disclosure.
Figure 2:
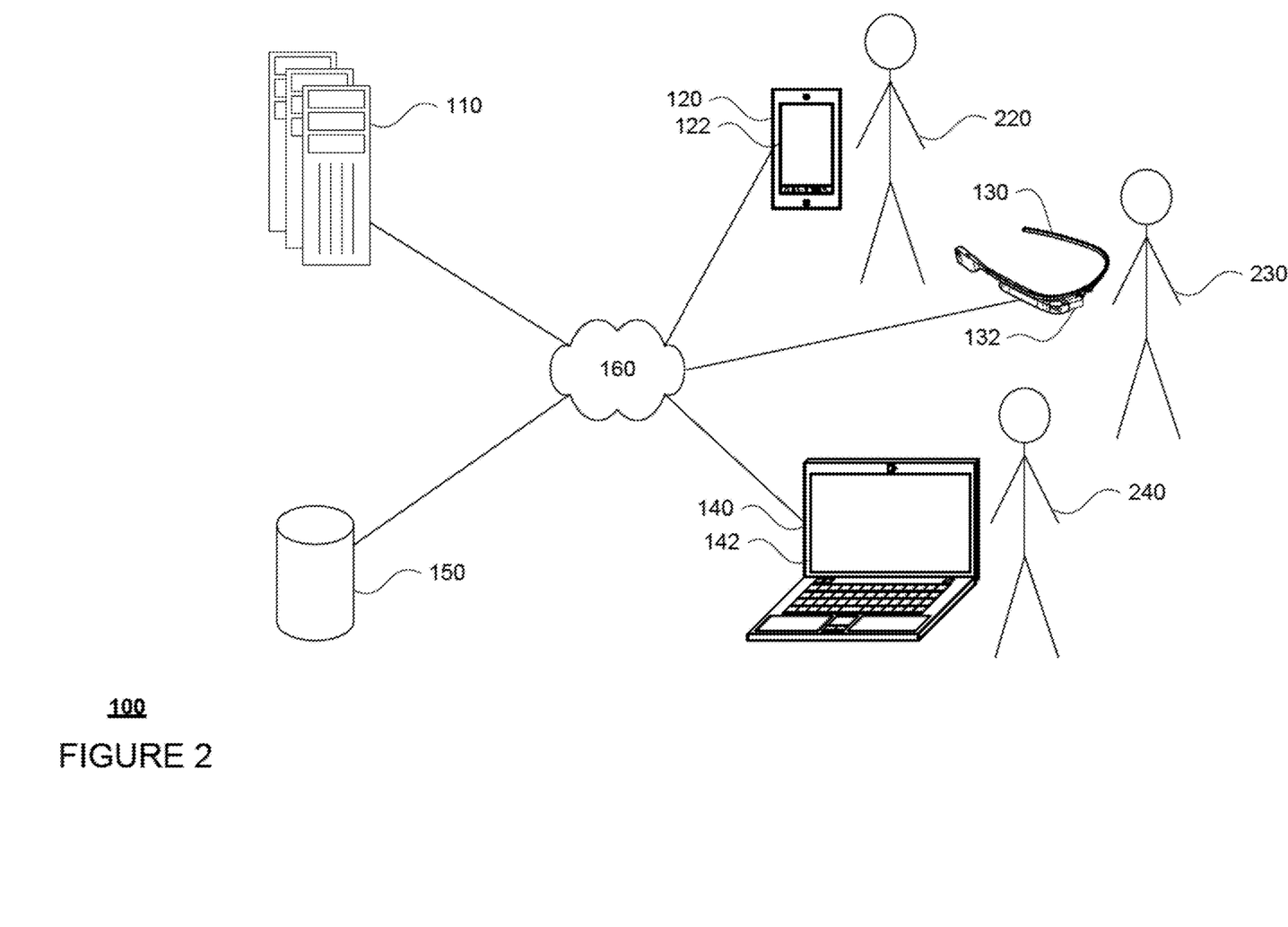
FIG. 2 is a pictorial diagram of the example system of FIG. 1.

FIGS. 1 and 2 include an example system 100 in which the features described above may be implemented. It should not be considered as limiting the scope of the disclosure or usefulness of the features described herein. In this example, system 100 can include computing devices 110, 120, 130, and 140 as well as storage system 150. Each of computing devices 110 can contain one or more processors 112, memory 114 and other components typically present in general purpose computing devices. Memory 114 of computing device 110 can store information accessible by the one or more processors 112, including instructions 116 that can be executed by the one or more processors 112.

Memory can also include data 118 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 116 can be any set of instructions to be executed directly, such as machine code, or indirectly, such as scripts, by the one or more processors. In that regard, the terms "instructions," "application," "steps" and "programs" can be used interchangeably herein. The instructions can be stored in object code format for direct processing by a processor, or in any other computing device language including scripts or collections of independent source code modules that are interpreted on demand or compiled in advance. Functions, methods and routines of the instructions are explained in more detail below.

Data 118 can be retrieved, stored or modified by the one or more processors 112 in accordance with the instructions 116. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can be any conventional processors, such as a commercially available CPU. Alternatively, the processors can be dedicated components such as an application specific integrated circuit ("ASIC") or other hardware-based processor. Although not necessary, one or more of computing devices 110 may include specialized hardware components to perform specific computing processes, such as decoding video, matching video frames with images, distorting videos, encoding distorted videos, etc. faster or more efficiently.

Although FIG. 1 functionally illustrates the processor, memory, and other elements of computing device 110 as being within the same block, the processor, computer, computing device, or memory can actually comprise multiple processors, computers, computing devices, or memories that may or may not be stored within the same physical housing. For example, the memory can be a hard drive or other storage media located in housings different from that of the computing devices 110. Accordingly, references to a processor, computer, computing device, or memory will be understood to include references to a collection of processors, computers, computing devices, or memories that may or may not operate in parallel. For example, the computing devices 110 may include server computing devices operating as a load-balanced server farm. Yet further, although some functions described below are indicated as taking place on a single computing device having a single processor, various aspects of the subject matter described herein can be implemented by a plurality of computing devices, for example, communicating information over network 160.

Each of the computing devices 110 can be at different nodes of a network 160 and capable of directly and indirectly communicating with other nodes of network 160. Although only a few computing devices are depicted in FIGS. 1-2, it should be appreciated that a typical system can include a large number of connected computing devices, with each different computing device being at a different node of the network 160. The network 160 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, each of the computing devices 110 may include web servers capable of communicating with storage system 150 as well as computing devices 120, 130, and 140 via the network. For example, one or more server computing devices 110 may use network 160 to transmit and present information to a user, such as user 220, 230, or 240, on a display, such as displays 122, 132, or 142 of computing devices 120, 130, or 140. In this regard, computing devices 120, 130, and 140 may be considered client computing devices and may perform all or some of the features described herein.

Each of the client computing devices may be configured similarly to the server computing devices 110, with one or more processors, memory and instructions as described above. Each client computing device 120, 130 or 140 may be a personal computing device intended for use by a user 220, 230, 240, and have all of the components normally used in connection with a personal computing device such as a central processing unit (CPU), memory (e.g., RAM and internal hard drives) storing data and instructions, a display such as displays 122, 132, or 142 (e.g., a monitor having a screen, a touch-screen, a projector, a television, or other device that is operable to display information), and user input device 124 (e.g., a mouse, keyboard, touch-screen or microphone). The client computing device may also include a camera 126 for capturing still images or recording video streams, speakers, a network interface device, and all of the components used for connecting these elements to one another.

Although the client computing devices 120, 130 and 140 may each comprise a full-sized personal computing device, they may alternatively comprise mobile computing devices capable of wirelessly exchanging data with a server over a network such as the Internet. By way of example only, client computing device 120 may be a mobile phone or a device such as a wireless-enabled PDA, a tablet PC, or a netbook that is capable of obtaining information via the Internet. In another example, client computing device 130 may be a head-mounted computing system. As an example the user may input information using a small keyboard, a keypad, microphone, using visual signals with a camera, or a touch screen.

As with memory 114, storage system 150 can be of any type of computerized storage capable of storing information accessible by the server computing devices 110, such as a hard-drive, memory card, ROM, RAM, DVD, CD-ROM, write-capable, and read-only memories. In addition, storage system 150 may include a distributed storage system where data is stored on a plurality of different storage devices which may be physically located at the same or different geographic locations. Storage system 150 may be connected to the computing devices via the network 160 as shown in FIG. 1 and/or may be directly connected to or incorporated into the memory of any of the computing devices 110-140 (not shown).

Storage system 150 may store images and associated depth information. For example, each image may be associated with a depth map defining the 3D location of objects in the image relative to the coordinate system of the camera that captured the image. These depth maps may be generated as described in more detail below.

Example Methods

In order to take advantage of the techniques described herein, the user may have to install an application, select a setting, and/or the like. Once the application or setting has been activated, the user may be able to generate depth maps for still images captured using a camera. As noted above, this camera may be associated with a client computing device, such as camera 126 of client computing device 140.

Before capturing a still image, a user may first be required to initialize a still image capturing mode of a client computing device. In some examples, this client computing device may be a mobile computing device such as client computing device 120, 130, or 140. Once the still image capturing mode is initialized, the application may cause the client computing device to automatically begin recording a video. As the user is holding the client computing device, the user may spend a few seconds holding mobile computing device steady. Because the user's hand is not perfectly steady, the mobile computing device may actually move several millimeters. The video may end when the client computing device begins to capture the still image of the scene, for example, when the user selects to take a picture.

Figure 3:
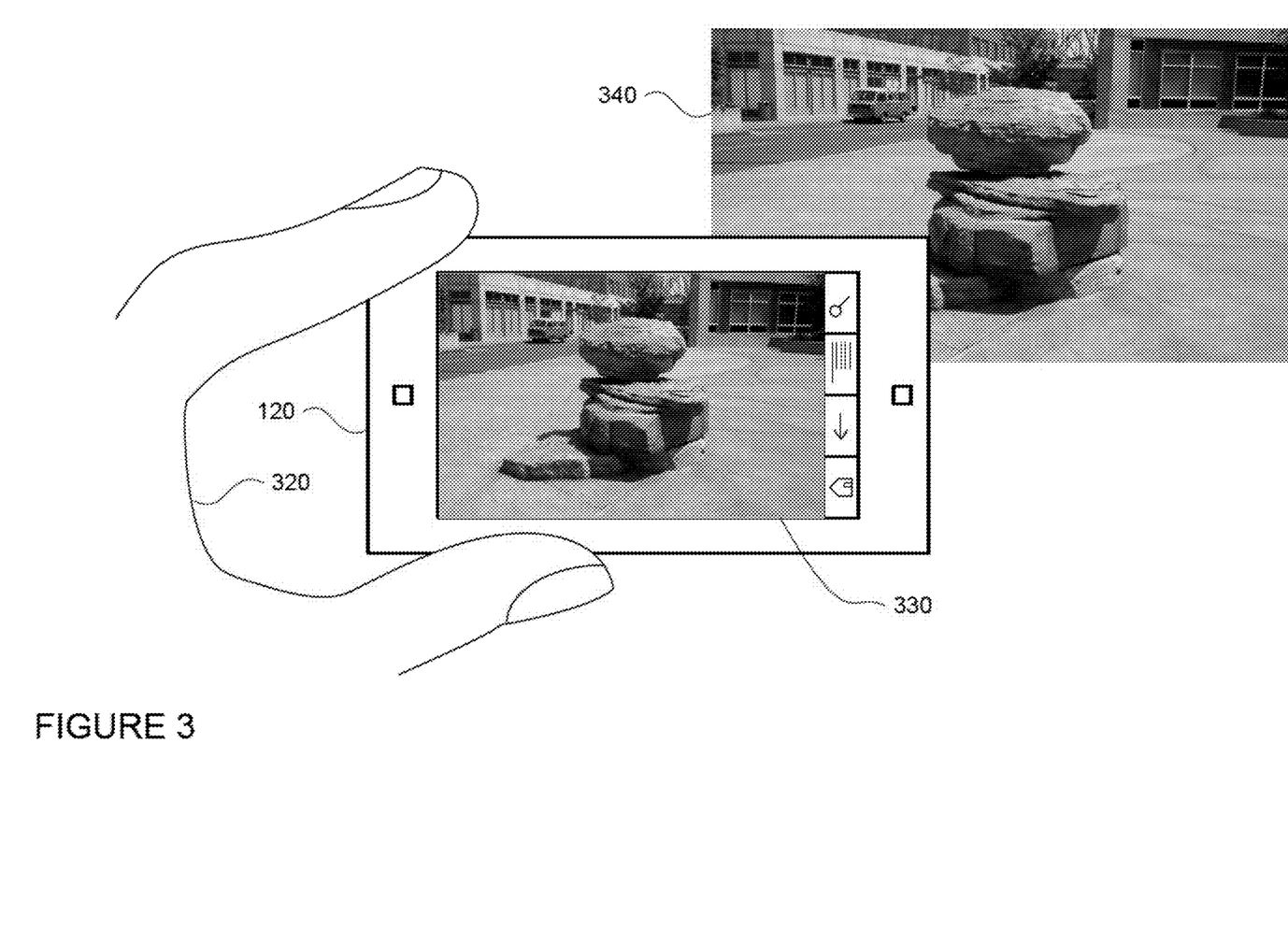
FIG. 3 is an example of a client computing device and user input in accordance with aspects of the disclosure.

For example, FIG. 3 is an example of a user attempting to capture a still image of a scene. In this example, user 220's hand 320 may attempt to hold client computing device 120 steady. During this time, the client computing device may capture a video of that same scene. In the example of FIG. 3, image frame 330 may represent the first image frame of the video captured before the user captures an image of scene 340. Again, when the client computing device 120 begins to capture the still image, the client computing device may stop capturing the video.

Figure 4:
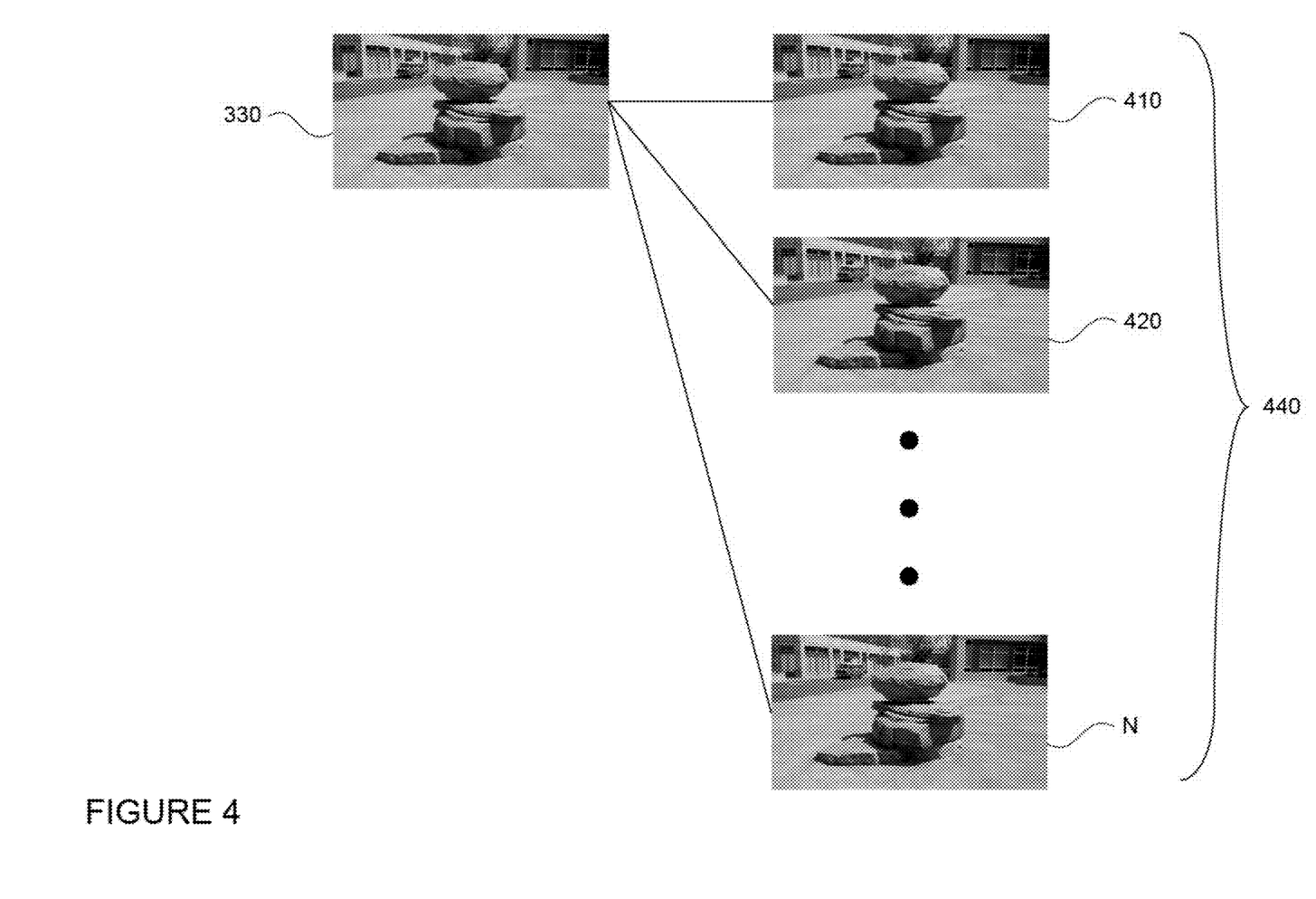
FIG. 4 is an example of image frames of a video stream in accordance with aspects of the disclosure.

In the few seconds that the user takes to hold the client computing device steady, the client computing device may capture a plurality of image frames. As noted above, a typical mobile phone may be able to capture about 100 image frames in 4 seconds. In the example of FIG. 4, image frame 330 plus each of the images 410 and 420 through N may represent a plurality of images frames of a video that begins with image frame 330. The next image in the sequence of image frames may be image frame 410, then 420, and so on until the last image frame in the video, image frame N.

After the video is captured, features may be tracked between image frames of the video. As an example, the Kanade-Lucas-Tomasi ("KLT") technique may be used to track features between image frames. The specific features tracked may include, for examples, unique features such as corners, edges, etc. For example, corner features may be detected in the reference image using known computer vision and pattern recognizing techniques.

The features may be tracked not in sequence, but directly between a reference frame and all other images. The reference frame may be, for example, the first image frame in the sequence, though other image frames may also be used as a reference frame. In the example of FIG. 4, image frame 330 may be considered the reference frame. Rather than tracking images between frame 330 and frame 410, then frame 410 and frame 420, and so on until image frame N, images are tracked from frame 330 to frame 410, from frame 330 to frame 420, etc.

This type of tracking may avoid the accumulating error and may provide better results, and is possible because the amount of movement between the reference frame and the other frames is slight. For example, with typical tracking the tracking error between each frame accumulates so that the error from frame 1 to frame N is sigma*sqrt(N), where sigma is the standard deviation of the inter-frame tracking error. Thus the error grows unbounded with N. But with direct tracking (frame 1 directly to frame N) using KLT, there is no accumulation; the error is just sigma, no matter how large N gets. This improved error characteristic may be critical for the successful 3D reconstruction described in detail below. Standard approaches for direct frame to frame correspondences, like Harris corner tracking and scale invariant feature transform ("SIFT") feature matching, may not provide as much precision and, thus, less accurate depth data.

Outlier features are an inevitable result of the feature tracking. Although the outliers may not always affect the results, they may be removed or ignored to ensure that they do not affect the results. For example, requiring that all of the features can be tracked to all non-reference image frames and that the maximum color gradient difference per pixel between two patches should be under a threshold may remove outliers. For example, in an 8-but encoded gray image, the threshold may be 6. The threshold may be selected, for example, using gain-adaptive tracking.

After the feature correspondences between image frames are determined, the camera's position and the actual 3D points of the features in the scene must be determined in order to generate the depth map. A bundle adjustment where the points are parametrized by inverse depth may be used. The bundle adjustment may be initialized using various assumptions. For example, all of the cameras for the image frames may be assumed to have the same location and orientation. In other words, in order to solve for the camera's position, an assumption of zero rotation or translation between the image frames is used as an initial guess for a numerical solve operation. In addition, the depths of the observed points in the scene may initially be set to random distances, for example between 2 and 4 meters. This initial guess may actually be close to the true solution, and by chance, a significant fraction of the randomly assigned depths will in fact be correct.

The following provides example equations from which may be used to generate the depth map. For example the captured video may be considered a sequence of $N_c$ image frames with $N_c$ points in 3 dimensions ("3D"). Every point may visible to all the images. The camera of the first image may be considered a reference, and the ith camera is related to the reference camera by a relative rotation matrix $R_i$ followed by relative translation $T_i = [T_i^x; T_i^y; T_i^z]$. The position of the jth point in the coordinate system of the reference camera may be $P_j$. The $P_j$'s position in the coordinate system of the ith camera may be $R_i P_j + T_i$. The rotation angles of the ith camera may be $\theta = [\theta_i^x; \theta T_i^y; \theta_i^z]$. Assuming that the angle are small, relative rotation matrix $R_i$ may be:

$$R_i = \begin{bmatrix} 1 & -\theta_i^z & \theta_i^y \\ \theta_i^z & 1 & -\theta_i^x \\ -\theta_i^y & \theta_i^x & 1 \end{bmatrix}.$$

To simplify the resulted optimization, each 3D point may be parametized by its inverse depth. Thus, $$P_j = \frac{1}{w_i}[x_j, y_{i,1}]^T,$$

where $(x_j, y_j)$ is the projection of $P_j$ in the reference image. The projection of $P_j$ in the ith image is $$P_{ij} = \frac{1}{w_i}[x_{ij}, y_{ij,1}]^T.$$

Using the above definitions, the cost function of the bundle adjustment in the retina plane may be defined as:

$$F = \sum_{i=1}^{N_c} \sum_{j=1}^{N_p} \left(\frac{e_{ij}^x + f_{ij}^x w_j}{c_{ij} + d_{ij} w_j}\right)^2 + \left(\frac{e_{ij}^y + f_{ij}^y w_j}{c_{ij} + d_{ij} w_j}\right)^2,$$

where $$a_{ij}^x = x_i - \theta_i^z y_i + \theta_i^y, \; b_{ij}^x = T_i^x, \; a_{ij}^y = y_i - \theta_i^x y_i + \theta_i^z x_i, \; b_{ij}^y = T_i^y,$$

$$c_{ij} = -\theta_i^y x_j + \theta_i^x y_j + 1, \; d_{ij} = T_i^z, \; e_{ij}^x = P_{ij}^x c_{ij} - a_{ij}^x,$$

$$f_{ij}^x = P_{ij}^x d_{ij} - b_{ij}^x, \; e_{ij}^y = P_{ij}^y c_{ij} - a_{ij}^y, \; \text{and} \; f_{ij}^y = P_{ij}^y d_{ij} - b_{ij}^y.$$

An $L^2$ norm may be used to measure the reprojection error. This may provide a useful statistical interpretation and may also be robustified.

Assuming that the correct camera poses are given and fixed, the depth estimation may be to find a point minimizing the following depth equation:

$$F_i(w_j) = \sum_{i=1}^{N_c} f_j^x(w_j) + f_j^y(w_j),$$

where

-continued $$f_j^x(w_j) = \left(\frac{e_{ij}^x + f_{ij}^x w_i}{c_{ij} + d_{ij} w_i}\right)^2 \text{ and } f_j^y(w_j) = \left(\frac{e_{ij}^y + f_{ij}^x w_j}{c_{ij} + d_{ij} w_j}\right)^2.$$

Estimating the depth may be simpler in the context of small motion, such as the user attempting hold a client computing device steady when capturing a still image as described above. For example, the general form of $f_j^x$ and $f_j^y$, $$f(x) = \left(\frac{x-a}{x-b}\right)^2,$$

where a and b are the zero and pole of the function, respectively. When a>b, the function may be convex in $$\left(b, \frac{3a}{2} - \frac{b}{2}\right).$$

When a<b, the function may be convex in $$\left(\frac{3a}{2} - \frac{b}{2}, b\right).$$

Assuming that $f_j^x(\overline{w}_j^x)=0$, then $$\overline{w}_j^x = -\frac{e_{ij}}{f_{ij}}.$$

Because $c_{ij} \approx 1$ and $$|d_{ij}| \ll \frac{1}{w_j}, w_j \ll \left|\frac{c_{ij}}{d_{ij}}\right|.$$

The $f_j^x(w_j^x)$ may be convex in $$\left(0, \left|\frac{c_{ij}}{2d_{ij}}\right|\right)$$

as is $f_j^y(w_j^y)$, and $F(w_j)$ may be convex in $$\left(0, \min_i \left|\frac{c_{ij}}{2d_{ij}}\right|\right).$$

As $$\left|\frac{c_{ij}}{2d_{ij}}\right|$$

may be much larger than reasonable values of $w_j$, $w_j$ may be optimized for the reprojection error in the depth equation above. If there is noise in the detection $P_{ij}$, it may not change $c_{ij}$ or $d_{ij}$, and the convex interval $$\left(0, \min_i \left|\frac{c_{ij}}{2d_{ij}}\right|\right)$$

of $F_j(w_j)$. In addition, the convexity analysis of the cost function may not depend on the approximation of the rotation matrix. Rather, it may be an exact property of depth estimation with small motion.

If the points are approximated at infinity, the cost function of the bundle adjustment in the retina plane above may be approximated by: $F \approx \sum_{i=1}^{N_c} \sum_{j=1}^{N_p} (e_{ij}^x)^2 + (e_{ij}^y)^2$. This approximation may be a convex function of the camera rotation angles on the domain around 0.

The uncertainty in the depth estimation may also be determined. For example, consider a rectified stereo pair separated by a baseline b. The relationship between the disparity and depth may be given by $$w = \frac{d}{fb},$$

where d may be the disparity and f may be the focal length of the camera. Ignoring quantization errors and mismatched features, the inverse depth estimation may be obtained at any single pixel, by $$\text{Var}[\hat{w}] = E[(\hat{w}-w)^2] = E\left[\left(\frac{d+\epsilon}{fb} - \frac{d}{fb}\right)^2\right] = \frac{\text{Var}[\epsilon]}{f^2 b^2},$$

where $\epsilon$ may be the localization error. First-order approximation need not be used. Assuming that there are n observations of the point and they have the same variance, the variance of the combined estimation may be $$\hat{w} = \frac{1}{n}\sum_{i=1}^{n} \hat{w}_i : \text{Var}[\hat{w}] = \frac{1}{n^2 f^2 b^2} E\left[\left(\sum_{i=1}^{n} \varepsilon_i\right)^2\right] = \frac{1}{f^2 b^2}\left(\frac{1}{n} + \rho\left(1 - \frac{1}{n}\right)\right)\text{Var}[\epsilon],$$

where $$\text{Cov}[\varepsilon^i, \varepsilon^j] = \rho \text{Var}[\epsilon]$$

for all i,j between 1 and n and i≠j, and $\text{Var}[\epsilon_i]=\text{Var}[\epsilon]$. This may indicate that if the feature detection errors are independent, the standard deviation of the inverse depth estimation may decrease linearly with $\sqrt{n}$. However, if the feature detection errors are fully correlated, multiple observations may not help reduce uncertainty. Similar conclusions may be drawn from depth.

The cost function of the bundle adjustment in the retina plane may also be optimized. For example, the cost function may be optimized using a portable C++ library that allows for modeling and solving large complicated nonlinear least squares problems such as Ceres Solver.

The result of the bundle adjustment is a depth map. This depth map may be considered a sparse depth map as it only includes an estimated depth for some fraction of the pixels in the reference image. In order to solve for depth for all of the pixels of an image, and provide a more complete depth map, a Markov random field ("MRF") framework may be used. This framework may be helpful to solve a smooth depth map as the depth signal at the pixels may be noisy. A smoothness function which accounts for relationships between non-adjacent pixels may be used in order to preserve consistency of depth around an object within the scene. Thus, in some examples, second order smoothness may be combined with long range connection in an MRF energy function.

The depth map may be associated with the image captured by the user. Such information may be useful to generate 3D models, for authentication, and for other such technologies. The depth map may also be used to generate a 3D representation of the scene. Because all of the image frames of the video are likely to show the scene from a similar viewpoint, the 3D representation may only be generated for that viewpoint. Thus, the output of the 3D representation may be of the reference view.

The following provides example equations from which may be used to generate the depth map. For example, the input may be a set of image frames. The index set of the pixels in a reference image frame I may be H, the color of the ith pixel may be I(i), i∈H, and D may represent a dense depth map. L may map each pixel index i ∈ H to a 2-dimensional ("2D") location in an image frame. The photo consistency function may be represented by P such that P(i, d) is the photo consistency score of the ith pixel at a distance d. The energy to be minimized may be represented by the following energy function: $E(D)=E_p(D)+\alpha E_s(D)+\beta E_c(D)$. In this example, $E_p$ may be the standard photo consistency term of the form: $E_p(D)=\Sigma_{i \in H}P(i, D(i))$. The function $E_s$ may represent the smoothness prior which places a cost function, $\rho_s$, on the smoothness function S of a neighborhood $N \subset H^3$, as well as a per-neighborhood conditional random field ("CRF") weight function W. In this regard, $E_p$ may be represented by $E_p(D)=\Sigma_{n \in H}W(i, n)\rho_s(S(D, n))$.

The function $E_c$ may connect distant pixels with similar colors as they are likely to have the same depth and belong to the same object. For example, a background object may be obstructed by an object in the foreground. The background object should have approximately the same depth on either side of the foreground object.

To build a connection between pixels are not adjacent, the function $$C(i, j, I, L, D) = \rho_c(D(i), D(j)) * \exp\left(-\frac{\|I(i) - I(j)\|^2}{\theta_c} - \frac{\|L(i) - L(j)\|^2}{\theta_p}\right)$$

may be used. The value $\theta_c$ may represent the robust measurement of depth different, and $\theta_c$ and $\theta_p$ may be parameters to control the connection strength and range. This function C(i, j, I, L, D) may provide a score for the depth assignment of the ith and the jth pixels based on the color intensities and their locations in the reference images. In this regard, $E_c$ may be the long range connection term of the form: $E_c(D)=\Sigma_{i \in H, j \in H, i \neq j}C(i, j, I, L, D)$.

Because it may be difficult to determine a global minimum of the energy function E(D), a progressive optimization may be used. For example, $E_p$ may be solved easily as no two pixels depend on one another. The function C(i, j, I, L, D) may be used to solve $E_p(D)+\alpha E_s(D)$. Alternatively, a similar MRF may be solved with first-order smoothness using approximate optimization such as graph cut and then use the resulted labels to initialize and solve $E_p(D)+\alpha E_s(D)$. The whole energy may be optimized as a continuous function as well, although this may be less efficient than other options. Alternatively, a mean field method with an efficient implementation may be used.

Figure 5A:
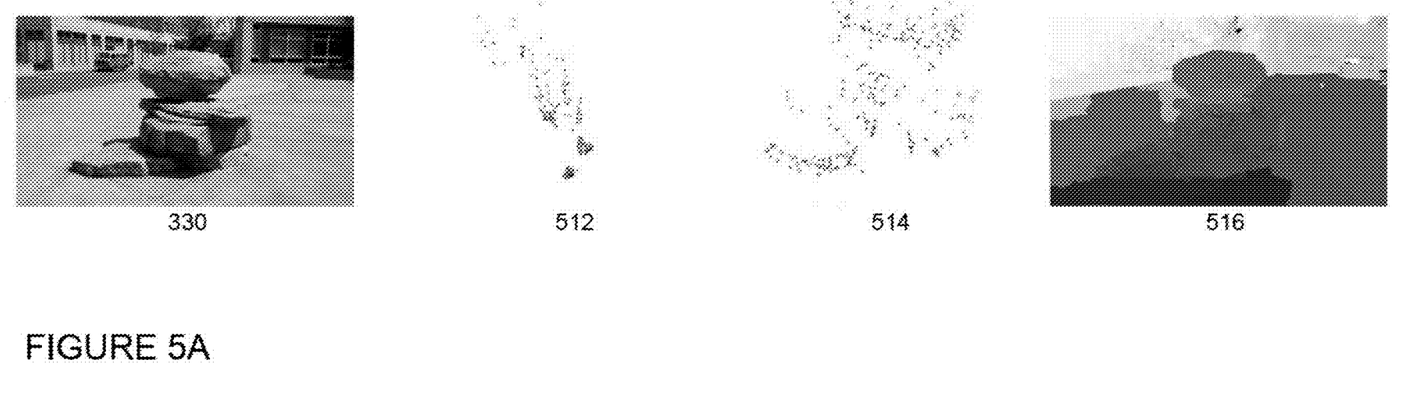
FIGS. 5A and 5B are examples of image frames and image data in accordance with aspects of the disclosure.

FIGS. 5A and 5B are examples of 3D reconstructions generated using the example techniques described above. FIG. 5A is an example of a reconstruction of reference image frame 330. Data 512 is a representation of the bundle adjustment results for image frame 330 using a video including approximately 100 image frames. Data 514 is a representation of the foreground points of data 512 and demonstrates that although distance points have relatively large uncertainty, the foreground points may recover shape fairly well. Data 516 is an example depth map generated from the bundle adjustment results of data 512.

Figure 5B:
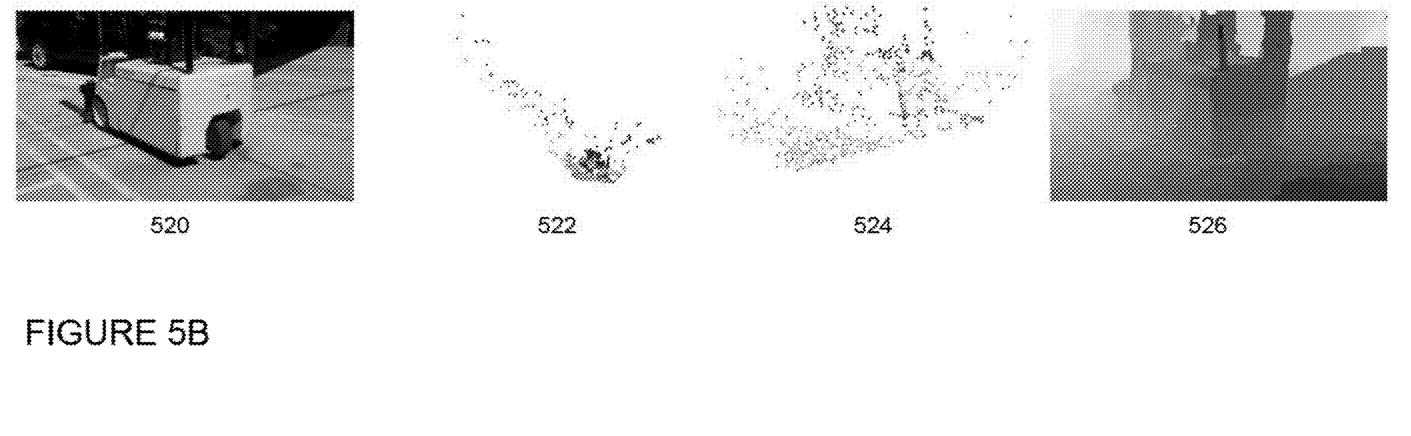

Similarly, FIG. 5B is an example of a 3D representation of a reference image frame 520. Data 522 is a representation of the bundle adjustment results for image frame 522 using a video including approximately 100 image frames. Data 524 is a representation of the foreground points of data 522 and demonstrates that although distance points have relatively large uncertainty, the foreground points may recover shape fairly well. Data 526 is an example depth map generated from the bundle adjustment results of data 522.

Figure 6:
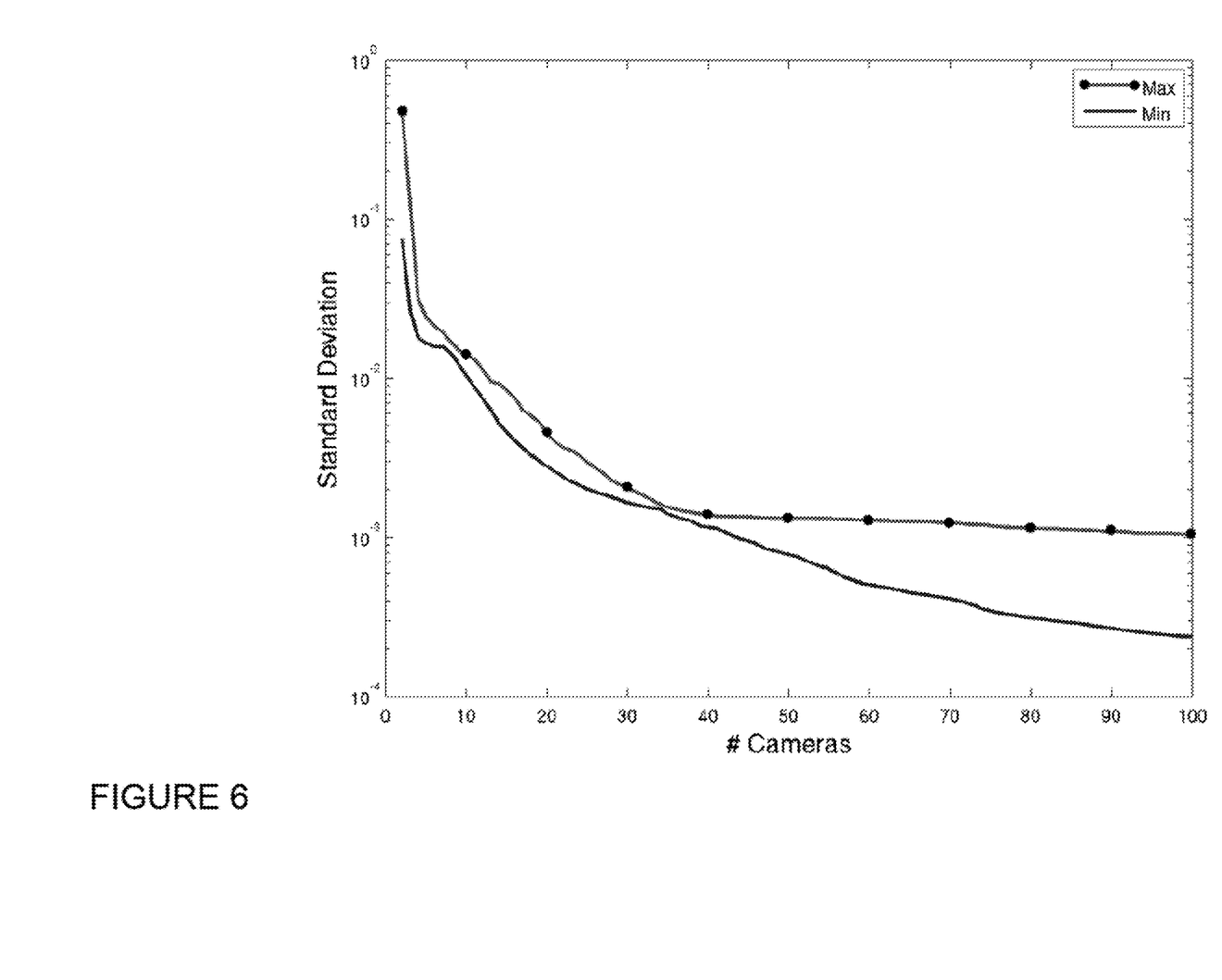
FIG. 6 is chart of example data in accordance with aspects of the disclosure.

The more image frames used, the greater the accuracy (or lesser the uncertainty) of the depth map. The minimum number of images required may depend upon various factors including the amount of light, the quality of the optics and resolution of the camera, the amount of movement by the user, and how far away the scene is. As an example, on a typical mobile phone under ideal conditions, 100 image frames may be captured in approximately 4 seconds and used to generate a depth map of an object between 2 and 5 meters with a depth error of about 0.25 meters 50% of the time. FIG. 6 demonstrates the change in depth estimation uncertainty with the number of cameras (video frames) in the example of FIG. 5A.

While a robustifier is not necessary, the bundle adjustment results may appear better when plotted, for example as shown in FIGS. 5A and 5B. Outliers can be neglected after the feature tracking and election as noted above. However, robustifiers may still improve the reconstruction results. After each optimization, the points with negative depth may be removed, and the optimization repeated with the remaining points.

Figure 7:
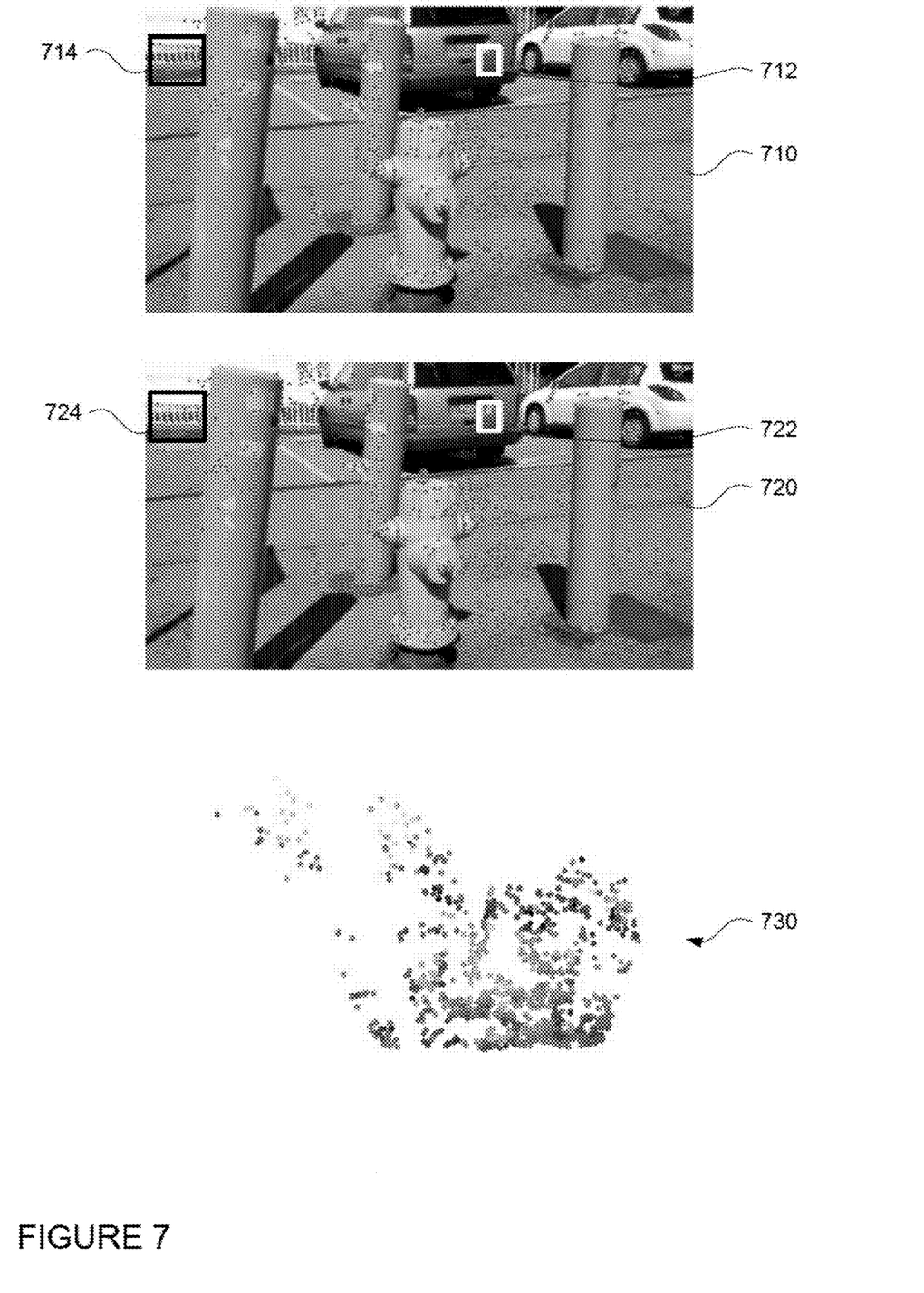
FIG. 7 is an example of image data in accordance with aspects of the disclosure.

FIG. 7 is an example of using a robustifier where the camera of the reference image frame is fixed at the coordinate origin. In this example, image frame 710 may be the 20th image frame in a video of approximately 100 image frames, and image frame 720 may be the 60th image frame in the video. These image frames are depicted with features points overlaid on the image frames. Rectangles 712, 714, 722, and 724 highlight tracking outliers. The bundle adjustment results for the video are depicted by data 730.

Alternatively, rather than performing the above described operations at the client computing device, the video, and in some examples, the captured image may be uploaded by the user to one or more server computing devices. In this regard, the depth map may be determined by the server computing device. The results may be associated with the image and stored by the server computing device and/or may be sent back to the client computing device.

Figure 8:
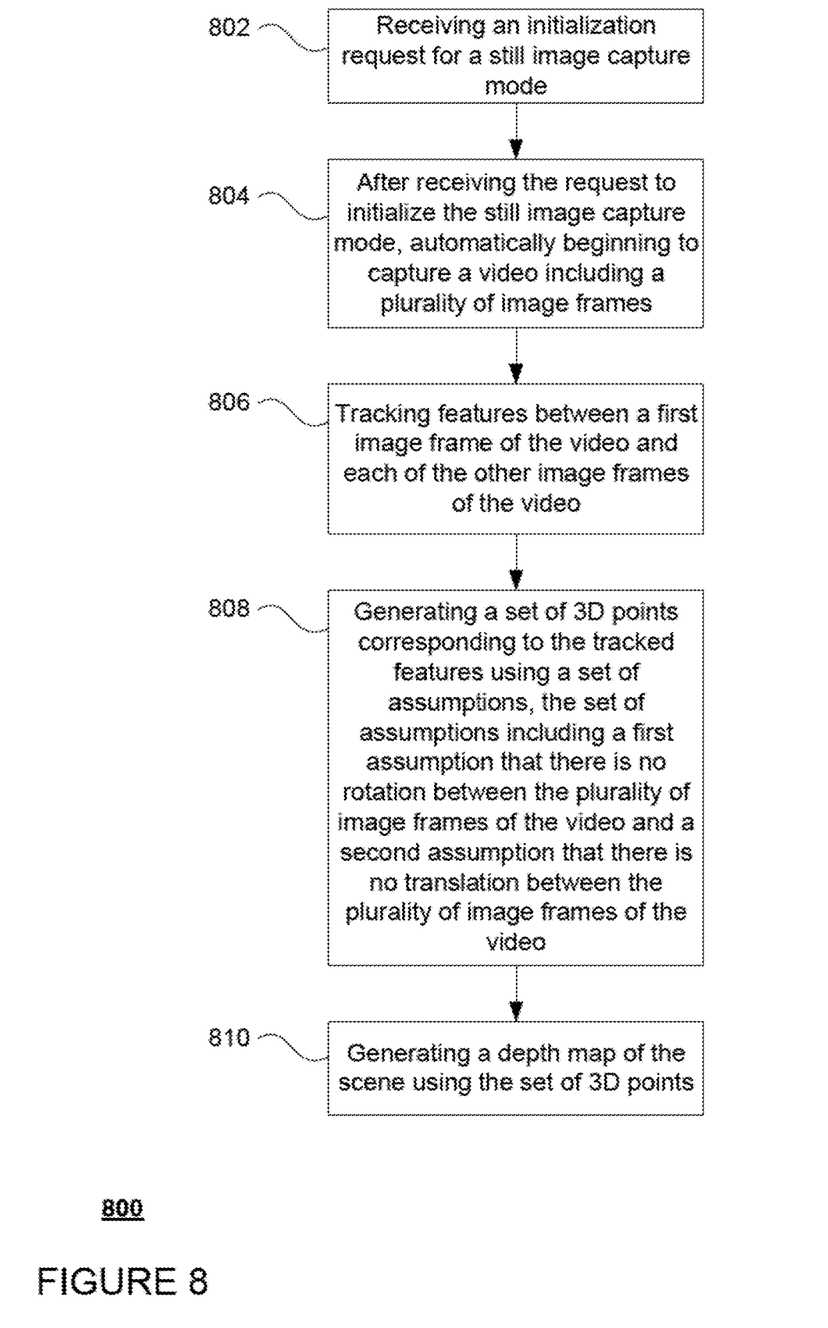
FIG. 8 is a flow diagram in accordance with aspects of the disclosure.

Flow diagram 800 of FIG. 8 is an example of some of the aspects described above which may be performed by one or more computing devices, such as the client computing devices described above. In this example, one or more computing devices receive an initialization request for a still image capture mode at block 802. After receiving the request to initialize the still image capture mode, the one or more automatically begin to capture a video including a plurality of image frames at block 804. The one or more computing devices track features between a first image frame of the video and each of the other image frames of the video at block 806. The one or more computing devices generate a set of 3D points corresponding to the tracked features using a set of assumptions at block 808. This set of assumptions includes a first assumption that there is no rotation between the plurality of image frames of the video and a second assumption that there is no translation between the plurality of image frames of the video. The one or more computing devices also generate a depth map of the scene based at least in part on the set of 3D points at block 810.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A computer-implemented method for generating depth maps comprising:
   receiving, by one or more computing devices having one or more processors, an initialization request for a camera mode for capturing a still image on a mobile computing device;
   after receiving the initialization request, and before capturing the still image in response to an input initiated by a user, automatically capturing, by the one or more computing devices, a plurality of image frames for generating a depth map, wherein the automatically capturing the plurality of image frames end when the user selects to take a picture;
   tracking, by the one or more computing devices, features between a first image frame of the plurality of image frames and each of the other image frames of the plurality of image frames;
   generating, by the one or more computing devices, a set of 3D points corresponding to the tracked features using a set of assumptions, the set of assumptions including an initial assumption that each image frame of the plurality of image frames was captured by a camera at a same location and same orientation;
   after automatically capturing the plurality of image frames, receiving the input initiated by the user, via the one or more computing devices, requesting capture of the still image;
   in response to receiving the input, capturing, by the one or more computing devices, the still image;
   generating, by the one or more computing devices, the depth map based at least in part on the set of 3D points; and
   associating, by the one or more computing devices, the depth map with the still image.

2. The method of claim 1, wherein generating the set of 3D points includes parameterizing each 3D point of the set of 3D points by its inverse depth.

3. The method of claim 1, wherein generating the depth map includes using a smoothness prior that considers relationships of non-adjacent pixels.

4. The method of claim 1, further comprising using the depth map to generate a 3-dimensional representation of a scene of the still image.

5. The method of claim 1, wherein the plurality of image frames are captured while the user is attempting to hold the mobile computing device steady in the camera mode.

6. The method of claim 1, wherein generating the set of 3D points is further based on a determination of a cost function for a bundle adjustment in a retina plane.

7. The method of claim 1, further comprising stopping the automatic capture of the plurality of image frames in response to receiving the input initiated by the user to capture the still image.

8. A system comprising one or more computing devices having one or more processors, the one or more computing devices being configured to:
   receive an initialization request for a camera mode for capturing a still image on a mobile computing device;
   after receiving the initialization request, and before capturing the still image in response to an input initiated by a user, automatically capture a plurality of image frames for generating a depth map, wherein the automatically capturing the plurality of image frames end when the user selects to take a picture;
   track features between a first image frame of the plurality of image frames and each of the other image frames of the plurality of image frames;
   generate a set of 3D points corresponding to the tracked features using a set of assumptions, the set of assumptions including an initial assumption that each image frame of the plurality of image frames was captured by a camera at a same location and same orientation;
   after automatically capturing the plurality of image frames, receive the input initiated by the user requesting capture of the still image;
   in response to receiving the input, capture the still image;
   generating the depth map based at least in part on the set of 3D points; and
   associating the depth map with the still image.

9. The system of claim 8, wherein the one or more computing devices are configured to generate the set of 3D points by parameterizing each 3D point of the set of 3D points by its inverse depth.

10. The system of claim 8, wherein the one or more computing devices are configured to generate the depth map by using a smoothness prior that considers relationships of non-adjacent pixels.

11. The system of claim 8, wherein the one or more computing devices are configured to use the depth map to generate a 3-dimensional representation of a scene of the still image.

12. The system of claim 8, wherein the one or more computing devices are configured to capture the plurality of image frames while the user is attempting to hold the mobile computing device steady in the camera mode.

13. The system of claim 8, wherein the one or more computing devices are configured to generate the set of 3D points further based on a determination of a cost function for a bundle adjustment in a retina plane.

14. The system of claim 8, wherein the one or more computing devices are configured to stop the automatic capture of the plurality of image frames in response to receiving the input initiated by the user to capture the still image.

15. A computer-implemented method for generating depth maps comprising:
- receiving an initialization request for a camera mode for capturing a still image on a mobile computing device;
- after receiving the initialization request, and before capturing the still image in response to an input initiated by a user, automatically capturing a plurality of image frames for generating a depth map, wherein the automatically capturing the plurality of image frames end when the user selects to take a picture;
- tracking features between a first image frame of the plurality of image frames and each of the other image frames of the plurality of image frames;
- generate a set of 3D points corresponding to the tracked features using a set of assumptions, the set of assumptions including an initial assumption that each image frame of the plurality of image frames was captured by a camera at a same location and same orientation;
- after automatically capturing the plurality of image frames, receive the input initiated by the user requesting capture of the still image;
- in response to receiving the input, capture the still image;
- generating the depth map based at least in part on the set of 3D points; and
- associating the depth map with the still image.

16. The device of claim 15, wherein generating the set of 3D points includes parameterizing each 3D point of the set of 3D points by its inverse depth.

17. The device of claim 15, wherein the method further comprises using the depth map to generate a 3-dimensional representation of a scene of the still image.

18. The device of claim 15, wherein the plurality of image frames are captured while the user is attempting to hold the mobile computing device steady in the camera mode.

19. The device of claim 15, wherein generating the set of 3D points is further based on a determination of a cost function for a bundle adjustment in a retina plane.

20. The system of claim 15, wherein the method further comprises stopping the automatic capture of the plurality of image frames in response to receiving the input initiated by the user to capture the still image.

* * * * *